United States Patent [19]
Wilkinson et al.

[11] 3,801,727
[45] Apr. 2, 1974

[54] COMPOSITE ELECTRICAL TRANSFORMER HOUSING

[75] Inventors: Robert E. Wilkinson, Lafayette; Robert B. Truitt; Richard F. Hunter, both of West Lafayette, all of Ind.; Ronald E. Bennett, Conover, N.C.

[73] Assignees: Rostone Corporation, Lafayette, Ind. ; by said Wilkinson and Truitt; General Electric Company, Pittsfield, Mass. ; by said Hunter and Bennett

[22] Filed: Sept. 25, 1972

[21] Appl. No.: 292,187

[52] U.S. Cl............... 174/50, 174/18, 174/37, 174/142, 220/46 R, 220/63 R, 336/84, 336/90, 336/92
[51] Int. Cl........................................ H01f 27/02
[58] Field of Search.......... 174/17 R, 17 LF, 17 CT, 174/18, 37, 50, 50.5, 50.52, 52 R, 52 S, 142, 152 R, 153 R; 220/5 R, 5 A, 46 R, 63 R, 85 TC; 229/3.5 MF; 336/58, 68, 90, 92, 94

[56] References Cited
UNITED STATES PATENTS

| | | | |
|---|---|---|---|
| 1,220,262 | 3/1917 | Mueller et al.............. | 220/46 R UX |
| 3,298,559 | 1/1967 | Lurie............................... | 220/63 R |
| 3,388,212 | 6/1968 | Nichols et al................... | 174/153 R |
| 3,523,157 | 8/1970 | Bauer et al.................. | 174/152 R X |
| 3,544,938 | 12/1970 | Bergmann et al..................... | 336/92 |
| 3,644,858 | 2/1972 | Galloway............................. | 336/92 |
| 3,685,682 | 8/1972 | Frey................................ | 220/46 R |

FOREIGN PATENTS OR APPLICATIONS

| | | | |
|---|---|---|---|
| 402,610 | 2/1969 | Australia............................ | 174/37 |

*Primary Examiner*—Laramie E. Askin
*Attorney, Agent, or Firm*—Trask, Jenkins & Hanley

[57] ABSTRACT

An electrical transformer housing or the like, adapted for direct-buried installation, comprises a tank and a cover sealed thereto, formed of composite walls. The walls have a formed metal liner over substantially their entire area and a molded plastic outer layer covering the entire outer surface of the liner, molded in place against the liner and bonded thereto. Rims on the tank and cover are molded integrally with the plastic outer cover, are sealed to each other outward of the liner by an intervening gasket, and interfit in a trough which receives sealing compound to fix the rims together and provide a secondary seal. Terminal conductor inserts are molded in place in bushings molded integrally with the outer layer of the cover, through openings in the cover liner. The metal liner forms a vapor barrier over as much as 99 percent of the area of the tank and cover to exclude moisture or other fluid which diffuses through the plastic outer layer and the plastic exterior protects the liner and provides corrosion resistance and other advantageous properties.

5 Claims, 7 Drawing Figures

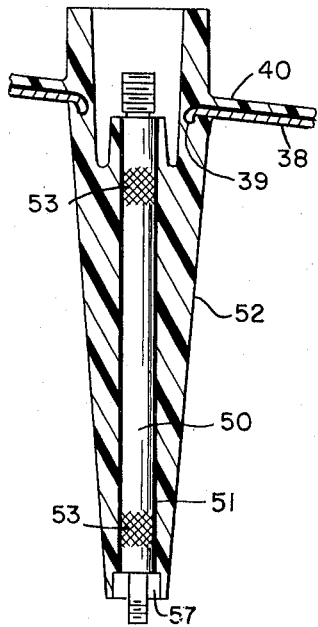
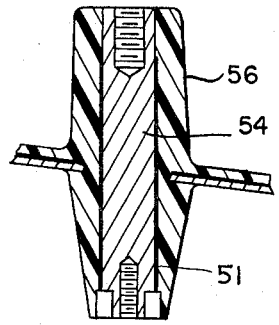
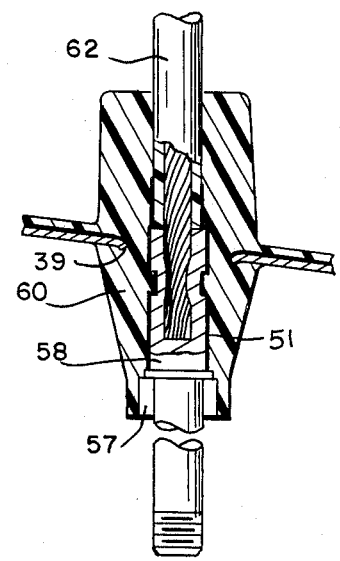
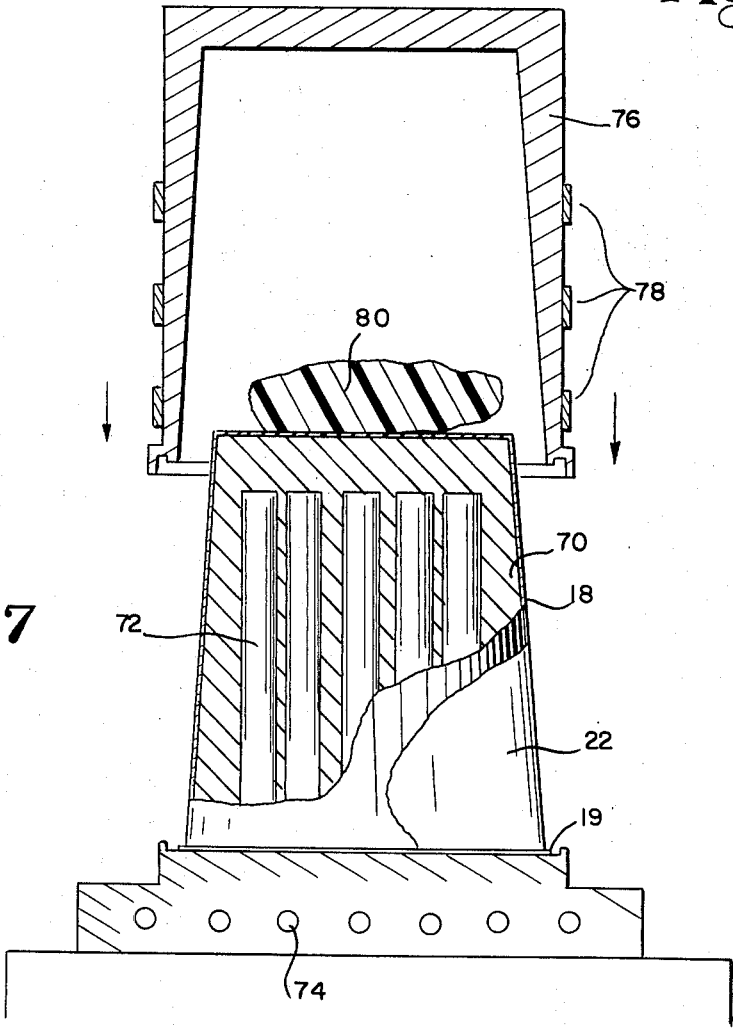

COMPOSITE ELECTRICAL TRANSFORMER HOUSING

BACKGROUND OF THE INVENTION

This invention relates to a housing for an electrical transformer or the like, adapted for direct buried installation in the ground and having an exterior composed of corrosion-resistant plastic composition. Its composite wall is desirably made by the method of the copending application of Robert E. Wilkinson, Ser. No. 292,188, filed Sept. 25, 1972.

Under ground installation of an electrical transformer requires a sealed housing which will withstand the several adverse physical and chemical conditions of a direct-buried environment, which provides under such adverse conditions a substantially complete barrier to leakage or diffusion of moisture through the housing walls to contaminate the oil or cause deterioration of the electrical insulation, and which will withstand the heat and thermal cycling of transformer operation and provide adequate heat transfer to the soil. The direct buried transformer must have a long life, of the order of 20 to 30 years, and the housing must have a very high resistance to the entrance of moisture in order to prevent an accumulation of moisture over that life time. A standard has been set of not more than 50 parts moisture per million parts of transformer oil over a life of 20 years. The transformer housing must also be economically competitive, as with mild steel tanks coated with bituminous coatings and provided with cathodic protection.

Molded plastic materials, such as molded glass-reinforced polyester resins, have a number of advantageous properties for this application, especially high corrosion resistance. However, walls molded of these resins are not completely impervious and moisture passes through them by diffusion, especially under the conditions of elevated temperature and temperature changes occurring in transformer operation. The present invention overcomes this fault of molded plastic materials and makes available for direct-buried installation a transformer housing having walls with an exterior of corrosion-resistant molded plastic material and with an inner vapor barrier which excludes moisture. The invention also permits the high voltage and low voltage terminal conductors for the transformer to be molded in place through its cover, in bushings integrally molded as part of the molded wall of the cover.

SUMMARY OF THE INVENTION

In accordance with the invention, an electrical transformer housing or the like adapted for direct-buried installation comprises a tank and a cover adapted to be sealed thereto, with the tank and cover formed by walls having a formed metal liner over substantially its entire area, and a molded plastic outer layer covering the entire outer surface of the liner, molded in place against the liner, and bonded thereto. The formed metal liner is of self-sustaining configuration and thickness so that it can be mounted in molding dies with its outer surface defining a portion of the mold cavity, to permit the plastic outer layer to be molded in place in conforming contact against the liner under heat and pressure in the molding dies. The outer layer is composed of a corrosion-resistant plastic molding composition, preferably a thermosetting composition such as a polyester resin molding composition. The plastic outer layer is substantially thicker than the liner so that the two together form a wall of high physical strength, the exterior of which is entirely composed of a thick layer of corrosion resistant plastic. The liner forms a vapor barrier to prevent entry of moisture which would diffuse through the plastic material.

The liner and the outer plastic layer are tightly bonded together over their entire interface so that there will be no pockets at the interface in which corona could occur to cause degradation of the plastic or in which moisture could collect to cause corrosion of the metal, or where gas or liquid could expand under temperature changes to separate the liner from the plastic layer to create larger pockets or from which gas or liquid could spread by capillary action to cause such separation. Such bonding may be effected in any desired way, but is preferably effected by the method of forming a composite disclosed in the said copending Wilkinson application. In that method, the liner is sprayed with a thin layer of elastomer adhesive, such as Neoprene in the presence of a bonding agent which produces a tight bond between the elastomer and the liner, the coating is dried to form a stable layer of incompletely cured elastomer on the liner surface, and the plastic outer layer is molded in place against that elastomer layer under heat and pressure which causes curing of both the molded plastic material and the elastomer layer, and such molding and curing is carried out in the presence of a coupling agent, preferably included in the elastomer composition, which causes integral chemical bonding between the elastomer layer and the molded plastic material.

Terminal conductors for the transformer are provided as inserts positioned through openings in the metal liner of the cover, and fixed and sealed in the cover wall by bushings integrally molded with the outer layer and extending through and fixed to the liner.

For sealing the cover to the tank of the transformer housing, the tank has a rim molded integrally with the outer layer which provides both a gasket surface and a trough outwardly therefrom, and the cover is molded with a rim integral with its plastic outer layer which provides a gasket surface and a depending flange adapted to enter the tank trough and to be fixed and sealed therein by a sealing composition such as epoxy resin.

The liners may be of any metal which provide the desired electrical, physical, and chemical properties. For example, aluminum is easily formed to provide metal liners for a transformer tank and has good vapor barrier properties. Aluminum and copper are good conductors and may be used for the conductor terminal inserts. Stainless and corrosion resistant metals may also be used as liners, as to withstand the effects of special transformer oils.

The plastic molding composition may be any molding composition which provides the desired physical, chemical and electrical properties, such as resistance to corrosion at the several pH values encountered in a direct-buried installation, adequate physical strength, and adequate electrical insulating properties to insulate the terminal inserts from each other and the metal liner. The plastic molding composition is preferably a thermosetting composition such as an ethylenically unsaturated thermosetting resin which is moldable under heat and pressure conditions in a metal die against the liner.

Both the molding composition and the liner must be compatible with the bonding system used to bond them together. With the bonding system of the copending Wilkinson application, polyester resins are especially suitable and are preferred. Other suitable resins include modified epoxy resins, allyl resins such as polymers of diallyl phthalate and diallyl isophthalate, mixtures of polyester and allyl resins, and others.

BRIEF DESCRIPTION OF THE DRAWINGS

The accompanying drawings illustrate the invention. In such drawings:

FIG. 4 is an enlarged section of the high voltage terminal bushing in the tank cover;

FIG. 5 is an enlarged section of the high voltage ground bushing in the tank cover;

FIG. 6 is an enlarged section of a low voltage terminal bushing in the tank cover; and FIG. 7 is a somewhat diagrammatic sectional view of molding dies used in forming the transformer tank.

DETAILED DESCRIPTION OF THE PREFERRED EMBODIMENT

Figure 1:
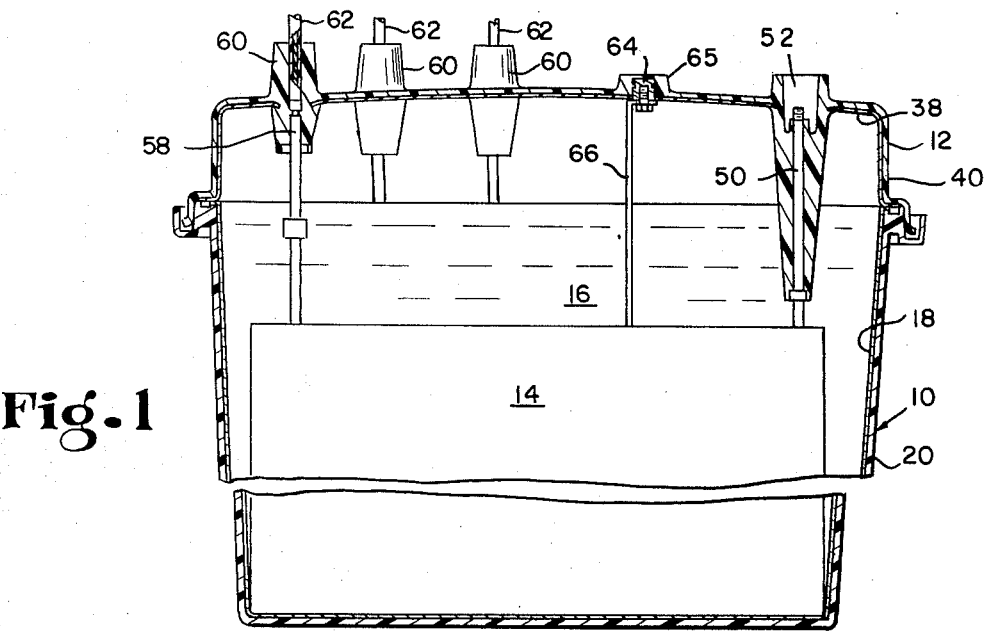
FIG. 1 is a vertical section through a transformer housing in accordance with the invention, taken on the line 1—1 of FIG. 2.
Figure 2:
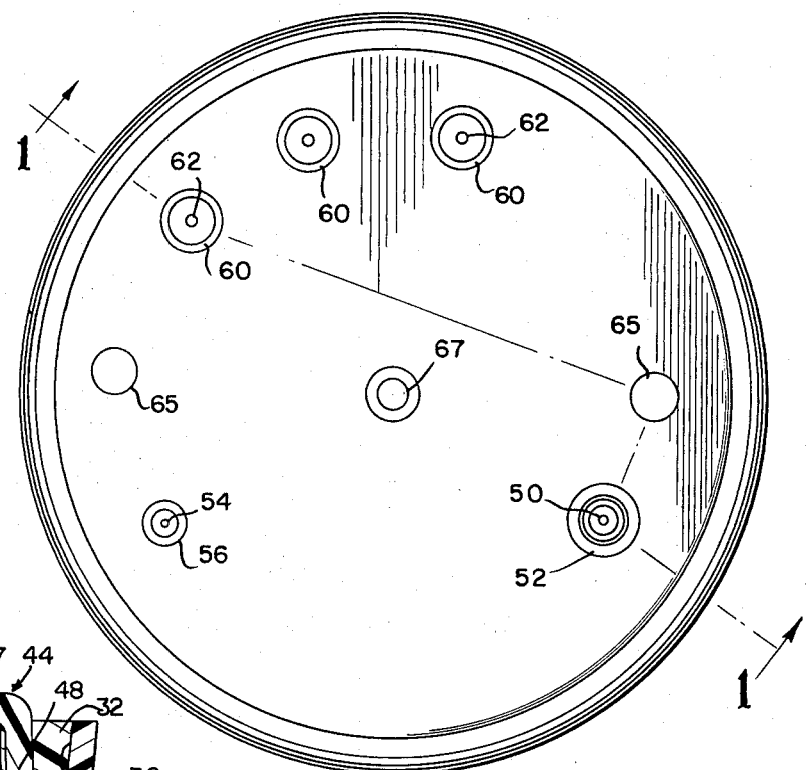
FIG. 2 is a top plan view of the housing of FIG. 1.

The transformer housing shown in FIG. 1 comprises a tank 10 and a cover 12 sealed to it with a double seal described below. The cover contains molded-in mounting inserts and terminal bushings by which a transformer 14 within the tank is suspended and connected to external conductors. The tank contains dielectric oil surrounding and covering the transformer 14. In accordance with common practice, the transformer contains cellulose insulation which is known to degrade in the presence of very small amounts of water, so that rigorous conditions must be established to exclude water from the inside of the tank. The tank is intended for direct burial under ground where it will be subjected to corrosion at various soil pH levels, where it will be continuously subjected to external moisture for long periods, where it must provide adequate heat transfer to the soil without significant increase in physical size, and where it must be capable throughout a long service life of maintaining its integrity and the integrity of the seal between its tank and cover during thermal cycling.

Figure 3:
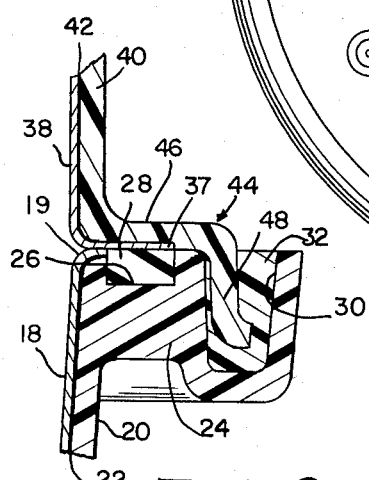
FIG. 3 is an enlarged section of the joint between the tank and cover of the transformer housing of FIG. 1.

The tank 10 has side and bottom walls, and comprises a formed aluminum liner 18 and a plastic exterior wall or layer 20 molded in place against the liner and bonded to it. As shown in FIG. 3, there is also a thin interface layer 22 between the liner 18 and the plastic wall 20, which is a preferred means of bonding the liner and the plastic wall together. The tank is of simple bucket shape and of circular cross section.

The upper edge of the tank 10 carries a rim 24 formed on its upper face with a circular groove 26 for the reception of a sealing gasket 28. Outwardly therefrom, the rim 24 is formed to provide a trough 30 for the reception of a depending flange of the cover. When the tank is assembled, the trough 30 is filled with a casting resin or sealing compound, such as an epoxy sealing compound 32.

The liner 18 is a self-sustaining formed unit which extends without interruption over the entire inner surface of the tank, and its rim 19 extends substantially to the gasket groove 26, so that it forms a vapor barrier over substantially the entire area of the tank.

The cover 12 is similarly formed of a shaped aluminum liner 38 and an outer plastic wall 40 molded in place against the liner 38 and integrally bonded thereto. As shown in FIG. 3 there is also an interface or bonding layer 42 through which the liner and plastic wall are bonded together. At the outer periphery, the cover carries a rim 44 having a horizontal stretch 46 which is adapted to rest on the sealing gasket 28, and having a depending flange 48 received in the trough 30 and sealed to the rim 24 of the tank 10 by the sealing compound 32 in that trough 30. The liner 38 contains holes at the conductor bushings, but otherwise extends over substantially the entire area of the cover. Its rim portion 37 extends at least partially across the gasket surface of the cover rim 46.

For connecting the transformer 14 to external conductors, the cover contains a high voltage lead or conductor 50 molded in a bushing 52; a high voltage ground 54 molded in a bushing 56; and three low voltage terminal conductors 58 molded in bushings 60 and connected to external insulated cables 62. The cover also has a pair of bosses 65 containing support inserts 64 from which the transformer 14 is hung by straps 66, and has a fill opening 67. The liner 38 of the cover is provided with openings at the bushings 52, 56 and 60, and such bushings are molded in place about the conductors as the plastic wall 40 of the cover is molded against the liner 38. The edge of each liner opening is buried within the body of the bushing, and such edge, especially at the high voltage terminal shown in FIG. 6 is bent in the form of a rounded flange 39, and to present a flux-diffusing surface toward the high voltage conductor 50.

In each instance, the conductor inserts should be mechanically fixed in the bushing against rotation and axial displacement, and should be sealed against leakage lengthwise along the surface of the conductor.

The high voltage terminal conductor 50 is desirably a rod of circular cross section with reduced threaded end portions. It may be knurled or serrated over parts 53 or over its entire length so that a mechanical interlock is formed as the bushing is molded about the conductor for sealing the rod in the bushing, the bushing may be formed at its lower end to provide an annular cavity 57 about the lower reduced end of the rod, and this may be filled with a sealing compound, such as that sold by General Electric Company under the trade name "Magiseal," which adheres to the surfaces of both the rod and the bushing. Preferably, the rod is bonded and sealed to the bushing by the method of the copending Wilkinson application, as described below, in which case the sealing compound may be omitted from the cavity 57.

The high voltage ground conductor 54 is a simple rod with threaded holes in its ends. It may be fixed and sealed in the bushing 56 in the same manner as the terminal 50, described above.

The low voltage conductor terminal 58 has an elongated lower rod portion with a threaded end, and a body portion which is bored to receive the bared wires of the insulated cables 62. The body is crimped to lock the wires in place, and this provides a non-circular section with which the molded bushing will interlock as it is molded in place. The conductor may be sealed with sealing compound in a groove 57 about its rod portion at the inner end of the bushing. Preferably, the terminal 58 is bonded and sealed to the bushing by the method of the copending Wilkinson application, as described below.

The method of forming the composite tank using the method of the copending Wilkinson application is illustrated by FIG. 7. A liner 18 of aluminum is formed, as by drawing or spinning, to the shape of a container with circular side walls and a bottom wall, and with a short rim 19 at its open end. Its walls have a thickness of 0.026 inch. The entire external surface of the liner is sprayed with a thin coating of elastomer solution. The coated liner is then heated or baked as in an oven at 300° F. to drive off the solvent and to leave on the surface of the liner 18 a stable continuous coating 22 of incompletely cured elastomer. The thus coated liner 18 is placed on the male die 70 of a set of molding dies in a press. The die 70 is heated by internal heaters 72 and additional heat may be supplied from base heaters 74. The female die 76 of the molding dies is mounted above the die 70 in the press, and is heated, as by band heaters 78. A charge of molding composition 80 is placed in the mold cavity, as on the end surface of the liner 18, and the upper die 76 is then lowered to close the cavity and force the plastic molding composition 80 to flow into all parts of the mold cavity. The dies are held closed, with the molding composition under heat and pressure, for a sufficient time to cure the thermoset molding composition 80. The dies are then opened, and the completed tank 10 is removed from the die 70. This forms the plastic outer layer of the composite walls of the tank, covering the entire outer surface of the liner. That layer may vary in thickness, for example, it may be 0.150 inch thick over the side walls and from 0.375 to 0.475 inch thick over the bottom.

The cover 12 is molded in a similar manner. A liner 38 of aluminum is formed and punched with suitable metalworking dies or tools to provide the desired configuration and the several openings at the bushings. The liner is then coated over its entire external surface with a coating of elastomer material, as by spraying. The coating may be applied to the back side of the liner at the openings. The coating is dried under heat to drive off the solvent and to leave a stable coating of elastomer composition in incompletely cured state. Preferably, the terminal conductors 50, 54 and 58 are also coated over all or selected parts of their side surfaces with coatings of elastomer composition, as by spraying, and the coatings are heated as in an oven to drive off the solvent and form a stable coating layer 51 of elastomer in incompletely cured state. The thus coated liner is placed in heated molding dies, in position to be supported by one of such dies, and with its coated surface exposed within the die cavity so that the molding composition will be molded against that coated face. The thus coated terminal conductors are also mounted in the dies in proper position relative to the openings in the liner 38, together with the support inserts 64 and a plug for the fill opening 67.

A batch of molding composition is then placed in the heated dies, and the dies operated to mold the composition against the coated surfaces of the liner 38 and the terminal conductors 50, 54, and 58. The molded composition is held under heat and pressure for a sufficient time to cure the molding composition in contact with the molded liner 38 and the coated terminal conductors, and this not only cures the molding composition but also completes the cure of he elastomer compsoition and produces an integral chemical bond between the liner and conductors on the one hand and the molded composition on the other. This forms a complete cover in a single molding operation, including the closure wall 38-40, its rim 44, and the several bushings.

In this procedure, which follows the teachings of the copending Wilkinson application, the elastomer and molding compositions may be any of those contemplated in that application. Examples of such compositions are as follows:

Elastomer
 Neoprene polymer—100 parts
 Curing agent, zinc oxide—5 parts
 Stabilizer, magnesia—5 parts
 Metal bonding agent,—5 parts
 Coupling agent, for bonding to the plastic,—5 parts Solvents, sufficient to give 15 to 35 percent solids—300 parts Molding Composition
 Polyester resin, styrene cross-linked—30 parts
 Filler, hydrated alumina—40 parts
 Reinforcement, fiber glass—30 parts
 Catalyst—1 part
 Parting agent—1 part

We claim:

1. A housing for an electrical transformer or the like, comprising:
 a tank having composite side walls of generally tubular configuration and an end wall integral therewith and closing one end thereof, said walls defining a container with one open end, and an integral peripheral rim at said open end arranged for supporting interengagement with a cover rim, and having an upward-facing seal-engaging surface,
 a cover having a composite dome-shaped end wall for closing the open end of the tank and an integral peripheral rim thereon arranged for interengagement with the tank rim so as to support the cover therefrom and having a downward-facing seal-engaging surface to be sealed to the tank rim,
 one or more terminal conductors extending through the cover wall, each supported in a bushing therein, said tank and cover comprising a formed metal liner, forming a vapor barrier over the inner surface of the tank or cover of which it forms a part, such liners having edge portions extending at least substantially to the interengaging faces of the rims of such tank or cover and being integral and continuous over the entire inner surfaces of such tank and cover, except for an opening to pass and to provide dielectrical separation from each terminal conductor extending through the housing wall, so that such liners extend at least substantially to the seal between the tank and cover and cover substantially the entire inner surface of the housing walls,
 the tank and cover also each comprising a corrosion-resistant outer layer of a thermosetting plastic molding composition molded in place under heat and pressure against said formed metal liner and extending over and in continuous bonded relation with the entire outer surface of the liner and extending over and beyond the edges of the liner at the rim of the tank or cover, sealing means between the rims of the tank and cover, including an inner sealing gasket substantially at the edges of the liners, and additional means outward of said liner edge portions to seal and fix the rims together so as to secure the gasket in sealing relation and form a closure outward of the liner edge portions, each said bushing being an integrally-molded bushing of thermoset plastic molding composition molded under heat and pressure about its terminal conductor in integrally-molded and continuous relationship with the adjacent outer plastic layer and in intimate conforming relationship with the terminal conductor so as to fix the same in the housing wall, and means sealing each terminal conductor to its bushing against leakage through the bushing longitudinally of the conductor.

2. A housing as in claim 1 which includes an interface layer of elastomer over substantially the entire outer surface of each liner and over at least a band portion about each terminal conductor, the plastic composition being in intimate, molded-in-place relationship against such interface layer and the interface layer containing a bonding agent bonding the same to the underlying metal and a coupling agent bonding the same to the overlying molded plastic composition.

3. A housing as in claim 2 in which the plastic molding composition is a polyester molding composition.

4. A cover for an electrical transformer housing or the like, comprising:

a composite dome-shaped end wall for closing the open end of a transformer tank and an integral peripheral rim thereon arranged for interengagement with a tank rim so as to be supported thereon and having a sealing face to be sealed to such tank rim, a plurality of spaced terminal conductors extending through the cover wall, each supported in a bushing therein, said cover comprising a formed metal liner forming a vapor barrier over the inner surface of the cover, such liner having an out-turned edge extending at least substantially to the sealing face of said rim and being integral and continuous over the entire inner surface of such cover, except for openings to pass and to provide a dielectrical separation from the said terminal conductors extending through the cover, the cover also comprising a corrosion-resistant outer layer of a thermosetting plastic molding composition molded in place under heat and pressure against said formed metal liner and extending over and in continuous bonded relation with the entire outer surface of the liner and extending over and beyond the edges of the liner at the rim of the cover, the bushing about each terminal conductor being an integrally molded bushing of thermosetting plastic molding composition molded in place under heat and pressure about the conductor and integral and continuous with the said outer layer, such bushing being in intimate conforming engagement with the conductor to rigidly fix the same in the cover wall, and means sealing each terminal conductor to its bushing against leakage through the bushing longitudinally of the conductor.

5. A cover as in claim 4 in which the plastic molding composition is a polyester molding composition.

* * * * *